Patented Dec. 22, 1953

2,663,711

UNITED STATES PATENT OFFICE 2,663,711

PROCESS FOR THE PREPARATION OF PYRIDINE ALCOHOLS FROM PYRIDINE N-OXIDES

Orville H. Bullitt, Jr., Newtown Square, Pa., assignor to E. I. du Pont de Nemours and Company, Wilmington, Del., a corporation of Delaware No Drawing. Application December 8, 1951, Serial No. 260,757

9 Claims. (Cl. 260—297)

This invention relates to heterocyclic organic compounds and more particularly to a novel method for preparing heterocyclic alcohols and esters.

A number of pyridine compounds and benzyl-type alcohols are known to possess biological activity. Compounds containing these two structures in the same molecule would therefore be of interest as materials for biological investigation. However, no satisfactory method for preparing pyridinecarbinols, the simplest compounds possessing this desired combination of groups, has hitherto been known. Thus the only known process for making 2-pyridinemethanol (Berichte 72B, 1188–94 1939), and German Patent 693,415) has given very low yields of the desired product.

This invention has as an object the provision of a process for the preparation of pyridine alcohols. Another object is the preparation of carboxylic acid esters of pyridine alcohols. Other objects will appear hereinafter.

These objects are accomplished by the following invention wherein an alkylpyridine N-oxide in which the carbon atom joining the alkyl group to the pyridine nucleus has attached to it at least one hydrogen atom is reacted with a carboxylic acid anhydride of the formula $(RCO)_2O$, wherein R is a monovalent hydrocarbon radical. In that phase of the invention directed to the formation of the pyridylcarbinol the resulting ester is hydrolyzed to form the pyridine alcohol.

The process of this invention is illustrated by the following equations for the preparation of 2-(5-ethylpyridine)methyl acetate from 5-ethyl-2-methylpyridine N-oxide and acetic anhydride, and its hydrolysis to 2-(5-ethylpyridine)methanol.

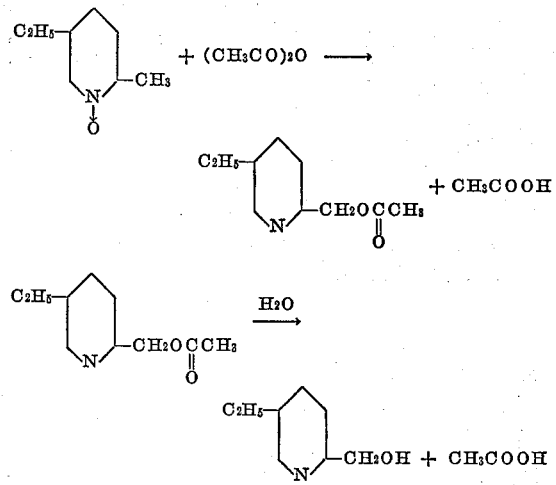

The process of the invention is conveniently carried out by gradually adding an alkylpyridine N-oxide, e. g., 2-methylpyridine N-oxide, to at least one molar equivalent of an aliphatic monocarboxylic acid anhydride. An excess of the anhydride is preferably used to serve as a reaction medium and to control the rate of reaction. Four to five moles of anhydride per mole of N-oxide are very satisfactory proportions. The reaction takes place with the liberation of heat and can be carried out at temperatures ranging from 25 to 100° C. It is preferably carried out at temperatures between 50 and 70° C. in order to control the reaction easily. A very satisfactory procedure consists in heating the anhydride to 60 to 65° C. and then adding the pyridine N-oxide gradually with external cooling until the exothermic reaction subsides. Although the reaction is substantially complete by the time the heat of reaction subsides, it is preferable to apply external heat to maintain the reaction temperature at 60 to 65° C. for a short time longer, e. g., about one hour. The ester which forms is isolated from the reaction mixture by fractional distillation. The pyridinecarbinol is obtained from this ester by hydrolysis using conventional methods. A suitable method of doing this consists in heating the pyridinecarbinol ester with a dilute aqueous solution of an alkali metal hydroxide, e. g., sodium hydroxide, until the ester is saponified. When the saponification is carried out in a 10 to 20% aqueous sodium hydroxide solution at reflux temperature reaction times of one-half to one hour are normally sufficient. However, the saponification can be carried out at lower temperatures and for longer times if desired. The saponification mixture is neutralized, then extracted with a solvent for the carbinol, e. g., methylene chloride, and the free carbinol isolated from the extract by distillation.

The alkylpyridine N-oxides used in the process of this invention can be prepared by known methods. An especially good method of preparing alkylpyridine N-oxides is illustrated by the following description of the procedure used in preparing 2-methylpyridine N-oxide. A solution of 136 parts of redistilled 2-methylpyridine (B. P. 129° C.) in 150 parts of glacial acetic acid is cooled to 15° C. and poured into a solution of 175 parts of 30% hydrogen peroxide in 150 parts of glacial acetic acid also previously cooled to 15° C. The reaction mixture is allowed to stand at room temperature overnight and is then heated on a steam bath for three hours. Water and acetic acid are removed by heating the solution on a hot plate until its temperature reaches 145° C. An excess of solid potassium hydroxide is added with cooling and the semisolid reaction mixture is extracted with benzene. The benzene solution is dried over potassium carbonate, filtered, and distilled. Refractionation of the pale yellow distillate yields 90 parts of 2-methylpyridine N-oxide boiling at 123° C. at 9 mm.

The following examples in which parts are by weight are illustrative of the invention.

EXAMPLE I

One hundred thirty-five parts of acetic anhydride is heated to 60-65° C. To this anhydride 34.3 parts of 5-ethyl-2-methylpyridine N-oxide is added gradually with stirring during a period of ten minutes. An exothermic reaction takes place and the temperature of the resulting red solution is maintained at 60-65° C. for 1.5 hours, this being accomplished by externally cooling the reaction mixture during the first half hour and then heating it slightly during the last hour. The reaction mixture is distilled under reduced pressure, and after removing acetic acid and excess acetic anhydride there is isolated a fraction boiling largely at 93° C./1.5 mm. which on refractionation yields 18.4 parts of 2-(5-ethylpyridine)-methyl acetate boiling at 119-124° C./5 mm. and having a refractive index $n_D^{25}$, of 1.4998. The ultraviolet absorption spectrum of this material indicates the presence of a pyridine nucleus without external conjugation, being quite different from that of pyridine N-oxide or a pyridone. The infrared absorption spectrum confirms the presence of the pyridine nucleus and indicates the presence of an ester group.

*Analysis*

Calculated for $C_{10}H_{13}O_2N$: C, 66.0%; H, 7.26%; N, 7.86%.
Found: C, 67.56%; H, 7.38%; N, 7.82%.

Eight parts of the 2-(5-ethylpyridine) methyl acetate is heated under a reflux condenser with 27 parts of 10% aqueous sodium hydroxide for one hour. The ester, which is only slightly soluble in water, slowly goes in solution during the first half hour of heating. The solution is then cooled, acidified with acetic acid, then neutralized with sodium bicarbonate and the aqueous mixture extracted with methylene chloride. The methylene chloride extract is dried over anhydrous magnesium sulfate, filtered and distilled. There is obtained 4.55 parts of colorless liquid boiling at 116-117.5° C./5 mm. and having a refractive index, $n_D^{25}$, of 1.5299. This liquid is 2-(5-ethylpyridine)-methanol. The structure is confirmed by ultraviolet and infrared absorption spectra and by elementary analysis.

*Analysis*

Calculated for $C_8H_{11}ON$: C, 70.1%; H, 8.03%; N, 10.22%.
Found: C, 70.00%; H, 8.29%; N, 11.06%.

The 2-(5-ethylpyridine)methanol forms a picrate melting, after recrystallization from ethyl alcohol, at 100-102.5° C.

EXAMPLE II

Using the procedure described in Example I, 125 parts of acetic anhydride is heated and stirred at 55-60° C. and 50 parts of 2-methylpyridine N-oxide is added over a period of five minutes. The temperature is maintained at 55-60° C. by external cooling for 35 minutes and by occasional heating for the next 45 minutes. At the end of this time there is isolated, by the procedure described in the preceding example, 2-pyridinemethyl acetate boiling at 112-117° C./5 mm. The crude ester is added to a solution of 30 g. of sodium hydroxide in 150 parts of water and the resulting dark reaction mixture heated one-half hour at reflux temperature and then cooled and extracted four times with methylene chloride. After drying the methylene chloride extract over anhydrous potassium carbonate, filtering, and fractional distillation, there is obtained 11.5 parts of 2-pyridinemethanol boiling at 111-112° C./15 mm. This 2-pyridinemethanol forms a picrate which, after four recrystallizations from ethyl alcohol, melts at 159-161° C. (The melting point of this compound given in the literature is 159° C.)

EXAMPLE III

A solution of 33.5 parts of 4-methylpyridine N-oxide in 135 parts of acetic anhydride is warmed slowly. When the temperature of the mixture reaches 70° C., an exothermic reaction takes place and the temperature of the mixture is held between 65 and 75° C. for three-fourths of an hour by external cooling. The reaction temperature then falls to room temperature. After standing overnight the mixture is distilled and there is obtained 24 parts of 4-pyridinemethyl acetate boiling at 85-95° C./4 mm. This ester is hydrolyzed as in the preceding examples to 4-pyridinemethanol.

EXAMPLE IV

Sixty parts of 2-ethylpyridine N-oxide is added with stirring during 15 minutes to 200 parts of acetic anhydride previously warmed to 60° C. An exothermic reaction starts when about one half of the oxide is added. The solution is held at 60-65° C. for a total of 1½ hours, slight cooling being needed for the first 25 minutes and warming for the remainder of the period. After this solution has stood overnight at room temperature, the acetic anhydride is removed by distillation and there is obtained 53 parts, corresponding to 66% of the theoretical, of 1-(2-pyridine)ethyl acetate boiling at 89-93° C./3 mm. and having a refractive index, $n_D^{25}$, of 1.4913.

This ester is saponified by refluxing in a solution of 36 parts of sodium hydroxide in 180 parts of water for one hour, during which period the organic layer goes into solution. After standing overnight, the aqueous solution is extracted with methylene chloride and the extract is distilled to remove the methylene chloride. Vacuum distillation of the residue gives 23.5 parts, 60% of the theoretical yield (based on the ester used), of 2-pyridinemethylcarbinol, a colorless viscous liquid boiling at 85-89° C./5 mm. and having a refractive index, $n_D^{25}$, of 1.5253. Infrared and ultraviolet absorption spectra of this substance agree with the structure of the compound as named.

*Analysis*

Calculated for $C_7H_9NO$: C, 68.2%; H, 7.36%; N, 11.38%.
Found: C, 68.72%; H, 7.43%; N, 10.18%.
Chloroplatinate, M. P. 169-172° C. (dec.).
Calculated for $(C_7H_9NO)_2 \cdot H_2PtCl_6$: Pt, 29.3%.
Found: Pt, 29.88%.

EXAMPLE V

Sixty parts of 2-ethylpyridine N-oxide is treated with 250 parts of propionic anhydride in exactly the same fashion as described in Example IV. On working up the reaction mixture as described in that example, 56.5 parts, corresponding to a 65% yield, of 1-(2-pyridine)ethyl propionate is obtained boiling at 115-119° C./10 mm.

and having a refractive index, $n_D^{25}$, of 1.4870.

Saponification of this 1-(2-pyridine)ethyl propionate by the method of Example IV gives 24 parts, 62% of the theoretical (based on the amount of ester used), of 2-pyridinemethylcarbinol boiling at 88-89° C./7 mm. and having a refractive index, $n_D^{25}$, of 1.5251.

The above examples have illustrated the invention with certain acid anhydrides and certain alkylpyridine N-oxides. The invention is however generic to the reaction of anhydrides of monocarboxylic acids having the general formula $(RCO)_2O$, wherein R is a monovalent hydrocarbon radical, with alkylpyridine N-oxides having hydrogen on extranuclear carbon directly joined to carbon of the pyridine ring. The invention thus includes within its scope, not only the reactions, illustrated above, of acetic and propionic anhydrides with 2-methyl-, 4-methyl-, 2-ethyl-, and 5-ethyl-2-methylpyridine N-oxides, but also the reactions of 2,6-dimethylpyridine N-oxide; 2,4,6-trimethylpyridine N-oxide; 2-n-amylpyridine N-oxide; and 3-ethyl-4-methylpyridine N-oxide, with isobutyric, n-caproic, palmitic, and benzoic anhydrides to prepare, for example, 2-(6-methylpyridine)methyl isobutyrate, 2-(4,6-dimethylpyridine)methyl acetate, 1-(2-pyridine)amyl caproate, and 4-(3-ethylpyridine)methyl palmitate. From such esters the carbinols may be prepared including, for example, 2-(6-methylpyridine)methanol, 2-(4,6-dimethylpyridine)methanol, 1-(2-pyridine)pentanol, and 4-(3-ethylpyridine)methanol. While the invention is generic to the reaction of compounds having an alkyl group attached to carbons of a pyridine ring and having hydrogen on the carbon of the alkyl group which is directly attached to said ring including, for example, alkylquinoline N-oxides, the preferred N-oxides are those of mononuclear alkylpyridines hydrocarbon except for the pyridine nitrogen. Alkyl pyridine N-oxides having hydrogen on carbon attached to the alpha and gamma positions of the pyridine ring, i. e., on carbon attached directly to the pyridine ring and separated from the pyridine nitrogen by an odd number of carbon atoms are further preferred.

When the pyridinecarbinols are the particular products desired, it is preferable, for economic reasons, to use an anhydride of a lower fatty acid, i. e., a carboxylic acid anhydride of the formula $(RCO)_2O$ wherein R is an alkyl radical of one to four carbon atoms, in the process of this invention since in the second step of the process the acid radical of the intermediate pyridinecarbinol ester is removed by hydrolysis. Acetic anhydride is especially preferred for this purpose.

While the reaction of the alkylpyridine N-oxide with the carboxylic acid anhydride is conveniently carried out in an excess of the anhydride which acts as a reaction medium and facilitates the control of the reaction, the process can also be carried out in the presence of an inert reaction medium, for example, a hydrocarbon or an ether, for example, benzene, octane, cyclohexane, dioxane, dibutyl ether, and the like. When an inert diluent is used, the proportion of anhydride to alkylpyridine N-oxide can be reduced to as low as one mole of anhydride to one mole of the alkylpyridine N-oxide if desired.

The process of this invention is superior to hitherto known methods for preparing pyridinecarbinols since these alcohols can be produced in much higher yields than heretofore. The pyridinecarbinols and the esters from which they are derived are useful in a wide variety of applications. They are especially useful as chemical intermediates, e. g., for the formation of amino acids and preparation of polymer basifying ingredients, and in the fields of dyes and biological materials.

The foregoing detailed description has been given for clearness of understanding only and no unnecessary limitations are to be understood therefrom. The invention is not limited to the exact details shown and described for obvious modifications will occur to those skilled in the art.

What is claimed is:

1. In the preparation of pyridine alcohols, the step which comprises reacting, with a monocarboxylic acid anhydride of the formula $(RCO)_2O$ wherein R is selected from the class consisting of alkyl and phenyl groups, a pyridine N-oxide which has hydrogen on alkyl carbon directly attached to pyridine ring carbon and which has, on pyridine ring carbon, only hydrogen and alkyl groups.

2. In the preparation of pyridine alcohols, the step which comprises reacting, with a monocarboxylic acid anhydride of the formula $$(C_nH_{2n+1}CO)_2O$$

wherein $n$ is 1 to 4, a pyridine N-oxide which has hydrogen on alkyl carbon directly attached to pyridine ring carbon and which has, on pyridine ring carbon, only hydrogen and alkyl groups.

3. In the preparation of pyridine alcohols, the step which comprises reacting, with acetic anhydride, a pyridine N-oxide which has hydrogen on alkyl carbon directly attached to pyridine ring carbon and which has, on pyridine ring carbon, only hydrogen and alkyl groups.

4. In the preparation of 2-(5-ethylpyridine)methanol the step which comprises reacting 5-ethyl-2-methylpyridine N-oxide with acetic anhydride.

5. In the preparation of 2-pyridinemethanol the step which comprises reacting 2-methylpyridine N-oxide with acetic anhydride.

6. In the preparation of 4-pyridinemethanol the step which comprises reacting 4-methylpyridine N-oxide with acetic anhydride.

7. In the preparation of 2-pyridinemethylcarbinol the step which comprises reacting 2-ethylpyridine N-oxide with acetic anhydride.

8. In the preparation of 2-pyridinemethylcarbinol the step which comprises reacting 2-ethylpyridine N-oxide with propionic anhydride.

9. In the preparation of 2-pyridinemethylcarbinol the step which comprises reacting 2-ethylpyridine N-oxide with a lower fatty acid anhydride $(RCO)_2O$ wherein R is an alkyl group of up to four carbon atoms.

ORVILLE H. BULLITT, Jr.

No references cited.